United States Patent [19]
Brown et al.

[11] Patent Number: 5,134,652
[45] Date of Patent: Jul. 28, 1992

[54] COMMUNICATION CONSOLE STATION WITH PRIORITY QUEUING

[75] Inventors: Allan G. Brown, Carol Stream, Ill.; Joseph DiFonzo, Thornhill, Canada; Daniel C. Sullivan, Glenview, Ill.; Peggy K. Matson, Chicago; Sheree Johnson, Lisle, both of Ill.

[73] Assignee: Motorola, Inc., Schaumburg, Ill.

[21] Appl. No.: 749,100

[22] Filed: Aug. 23, 1991

[51] Int. Cl.⁵ .............................................. H04M 5/04
[52] U.S. Cl. .................................. 379/163; 379/165; 379/266; 379/309
[58] Field of Search ............... 309/163, 156, 157, 162, 309/164, 165, 266, 309

[56] References Cited

U.S. PATENT DOCUMENTS 4,757,529  7/1988  Glapa et al. .......................... 379/266

*Primary Examiner*—Stafford D. Schreyer
*Attorney, Agent, or Firm*—Susan L. Lukasik; Steven G. Parmelee

[57] ABSTRACT

A communication console station links a plurality of communication resources (101, 103, and 105) for use by an operator. Incoming calls are placed in an incoming-call queue (207), calls on hold are placed in a holding queue (209), and all available communication resources are placed in a resource queue (211) The operator presses a single button (303, 305, or 307) to obtain the top resource from the associated queue (207, 209, or 211), which lists resources according to a predetermined priority.

20 Claims, 5 Drawing Sheets

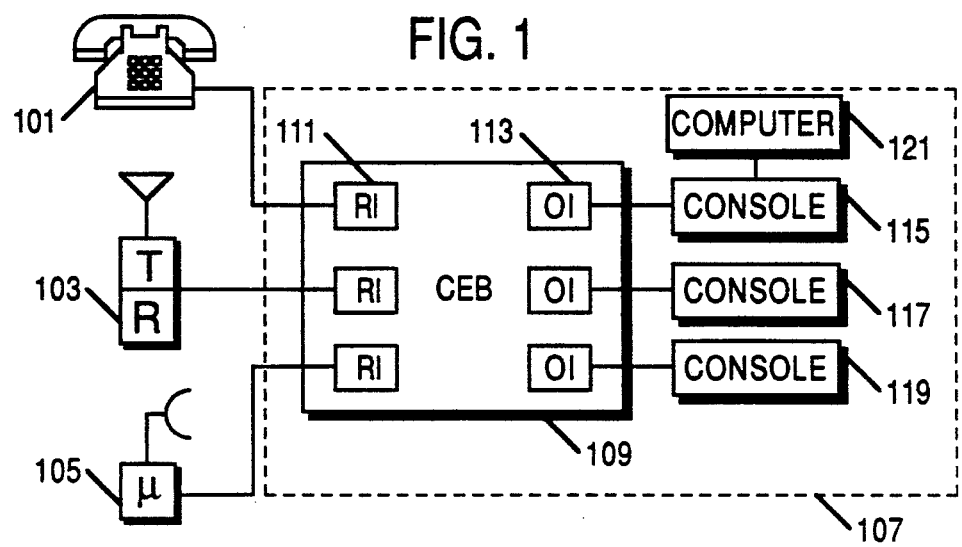
FIG. 1
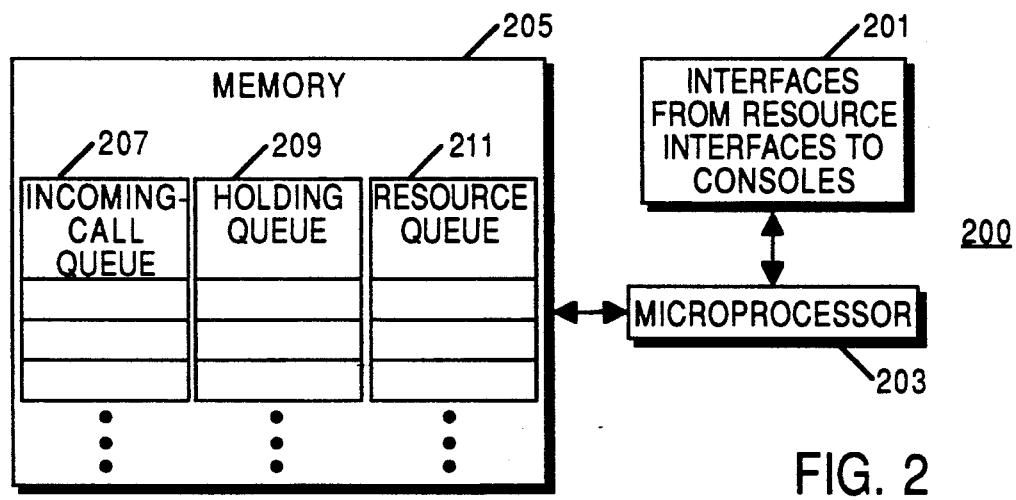
FIG. 2
FIG. 3
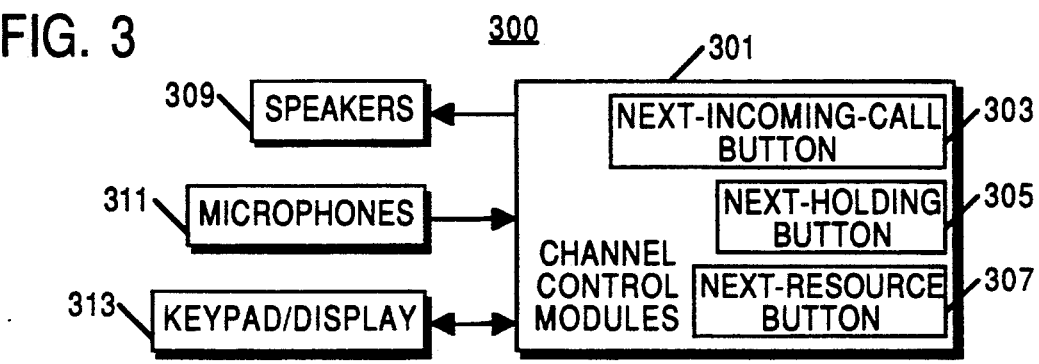

COMMUNICATION CONSOLE STATION WITH PRIORITY QUEUING

FIELD OF THE INVENTION

This invention relates to radio/telephone system console stations, including but not limited to queuing of incoming lines in radio/telephone system console stations.

BACKGROUND OF THE INVENTION

Radio/telephone system communication console stations are also known as control console centers. Control console centers are commonly employed to control several transceivers from a common location. Generally, the control console enables a dispatcher to integrate and control voice and data communications from both two-way radio channels and telephone lines. Such control console centers typically provide the operator with at least two speakers for transducing audible information. Generally, one speaker (select audio speaker) is used for monitoring a selected communication resource, either a radio or telephone call, and the other speaker (mix speaker) is used for monitoring a mix of nonselected communication resources. Each communication resource, radio channel or telephone line, has a dedicated portion of the console which includes an LED (light emitting diode) that blinks when a call is incoming on that resource. The operator then selects that resource to activate the call on the select audio speaker and handles the call accordingly.

Typically, control console centers are utilized by police and fire departments, airline controllers, utilities service, and emergency 911 operators. Thus, these console centers are usually operated in critical situations that could easily be life-and-death. Operators are continually receiving and making important telephone and radio calls that must not be lost. Many times, multiple calls simultaneously require attention at one console. Since consoles may easily handle over one hundred calls, it is virtually impossible for the operator to keep track of when the calls arrive in order to handle them in the order in which they arrived. If the operator guesses or picks up calls randomly, an urgent call can possibly be waiting for many minutes, which is highly undesirable since many of these calls are trying to draw attention to a critical situation. Even if only a few calls are incoming, reviewing the entire console for incoming calls could waste precious seconds that may mean life or death for someone.

When multiple lines ring at the same time on a console, some operators choose to pick up each call and immediately put it on hold before proceeding to handle each call individually. If too many calls come it at once, the operator may not be able to remember the order that the calls came in and consequently could delay an important call in a critical situation. Similarly, the operator may need to make an outgoing call quickly to provide emergency assistance. If many calls are at the console, it may take up to a minute to locate an unused resource. That minute could be a very costly minute in an emergency situation.

Accordingly, a method and apparatus to provide the operator with the necessary resources to quickly and efficiently handle multiple incoming communication resources simultaneously is desired.

SUMMARY OF THE INVENTION

The invention encompasses a communication console station that links a plurality of communication resources to the communication console station simultaneously. A first incoming call is received on a first of the plurality of communication resources. A second incoming call is received on a second of the plurality of communication resources while the first incoming call is received. The first incoming call and the second incoming call are placed in an incoming-call queue according to a predetermined priority. An incoming call is automatically selected from the incoming-call queue when it is desired to answer an incoming call.

BRIEF DESCRIPTION OF THE DRAWINGS

FIG. 1 is a block diagram of a communication system with a communication console station in accordance with the invention.

FIG. 2 is a block diagram of an operator interface in a communication console station in accordance with the invention.

FIG. 3 is a block diagram of a communication console in accordance with the invention.

DESCRIPTION OF A PREFERRED EMBODIMENT

Figure 4:
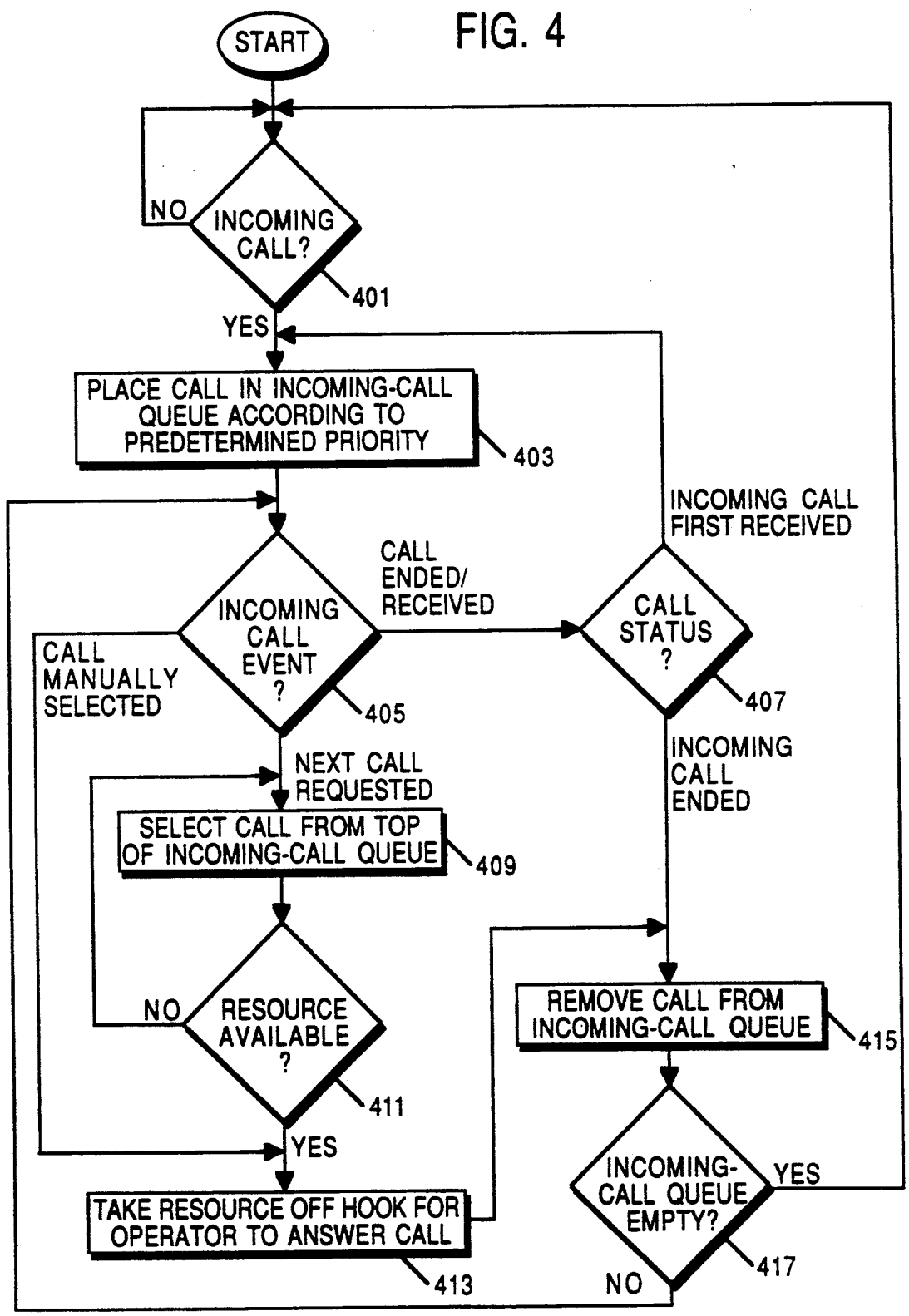
FIG. 4 is a flowchart showing selection of the next incoming call in accordance with the invention.

The following describes a method and apparatus to provide an operator of a communication console with necessary resources to quickly and efficiently handle multiple incoming communication resources simultaneously. Incoming calls are placed in an incoming-call queue according to a predetermined priority. When a next-incoming-call button is pressed, the incoming call on the top of the queue is automatically selected for the operator to handle without the operator having to keep track of calls or look for flashing LEDs. Similar queues are described which are used to find calls on hold and available resources for outgoing calls.

A block diagram of a communication system using a communication console station ("console station") is shown in FIG. 1. Communication resources, such as telephone lines, radio frequency channels, and microwave links, are received at appropriate stations, such as a telephone receiver 101, base station 103, and microwave receiver 105, respectively. These stations 101, 103, and 105 transfer the communications, typically using wireline or telephone line, from their respective resources to a console station 107 that directs the communications to the operator(s) on duty.

The console station includes a resource interface (RI) 111 for each telephone line, RF channel, or microwave link to be handled by the operator. There may be any number of resources connected to the console station, although only three resource interfaces are shown for simplicity of the drawing. All resource interfaces are maintained within a central electronics bank (CEB) 109. One or more consoles 115, 117, and 119 may be attached to the CEB 109. Although only one CEB 109 is shown, the invention will work with multiple interconnected CEBs as well. Each console, also known as an operator position, allows an operator to handle incoming calls on the communication resources (see FIG. 3 and associated text for more information). An operator interface (OI) 113 is coupled to the CEB 109 for each console 115 (see FIG. 2 and associated text for more information). An optional personal computer 121 may be attached to a console 115 to provide computer assistance in finding necessary information or dialing telephone numbers automatically (see FIG. 7 and associated text for more information). Within the CEB 109, each resource interface is connected to each operator interface, although these connections are not shown to keep the drawing simple.

An operator interface 200 in a communication console station is shown in the block diagram of FIG. 2. The operator interface 200 includes interfaces 201 from each resource interface to the console that the OI is designated to handle. A microprocessor 203, such as a 68000-based microprocessor available from Motorola, Inc., controls the functions of the OI using provided memory 205. Within this memory are three queues: an incoming-call queue 207, a holding queue 209, and a resource queue 211. These queues are described in further detail in FIG. 4 (incoming-call queue), FIG. 5 (holding queue), and FIG. 6 (resource queue).

A block diagram of a communication console 300 is shown in FIG. 3. Channel control modules 301 include a set of buttons (not all shown) and LEDs (not shown) for each communication resource ("resource") to be handled at the console 300. The buttons select/deselect, or put calls on hold. LEDs indicate when a resource is incoming, outgoing, or on hold. Other functional buttons within the channel control modules 301 include a next-incoming-call button 303, a next-holding button 305, and a next-resource button 307. When the next-incoming-call button is pressed, the resource at the top of the incoming-call queue is selected and put on-speaker for the operator. Similarly, when the next-holding button is pressed, the resource at the top of the holding queue is selected, removed from hold, and put on-speaker for the operator. When the next-resource button is pressed, the resource at the top of the resource queue is selected for use as an outgoing resource to the operator. Each control console has speakers 309, microphones 311, and a keypad/display 313 to aid the operator in handling calls. An alternate embodiment of the communication console 300 is in a personal computer with a large screen monitor for viewing the channel control modules 301. Button activation, such as for the next-incoming-call button 303, is completed by using a pointing device, such as a mouse, to find a part of the screen showing the desired button and clicking on the screen at the button location to depress the button. LED functions are shown on the screen as well. Speakers 309 and microphones 311 are provided as with a buttons and LEDs embodiment.

Selection of the next incoming call is shown in a flowchart in FIG. 4. If at step 401 a new call is incoming (one that is not yet in the incoming-call queue 207), the call is placed in the incoming-call queue 207 according to a predetermined priority at step 403. This priority may be as simple as chronological order, where the first call in time-wise is placed at the top of the queue 207, and each subsequent call is placed below it as time progresses. A priority may be set up which distinguishes between emergency resources and non-emergency resources, and all emergency resources are placed at the top of the queue 207, in chronological order, and all non-emergency resources are placed below any emergency resources which may be in the queue 207. Establishing a multi-priority queue allows, for example, a call for the fire department to have priority over a previously received call simply requesting a tow truck. There are many other priorities, but no others will be detailed here for the sake of simplicity.

If the incoming call event at step 405 is a next incoming-call request, as accomplished by the operator pressing the next-incoming call button 303 on the console 300, the call at the top of the incoming-call queue 207 is selected at step 409. If the resource for the selected call is available at step 411, the resource is taken off hook for the operator to answer the call at step 413. At step 415, the selected call is removed from the incoming-call queue 207. If the incoming-call queue is empty, the process continues with step 401, otherwise the process continues with step 405. If the resource is not available at step 411, for example, another console may have acquired the resource before this console, another resource is sought by continuing with step 409. If the incoming call event at step 405 is a call that is manually selected by the operator, the process continues with step 413. If the incoming call event at step 405 is a call ended/received (call status), the process continues with step 407. If at step 407 the call status is an incoming call that is first received, the process continues with step 403. If at step 407 the call status is an incoming call that has ended, for example due to the calling party terminating (hanging up) the call, the process continues with step 415.

Figure 5:
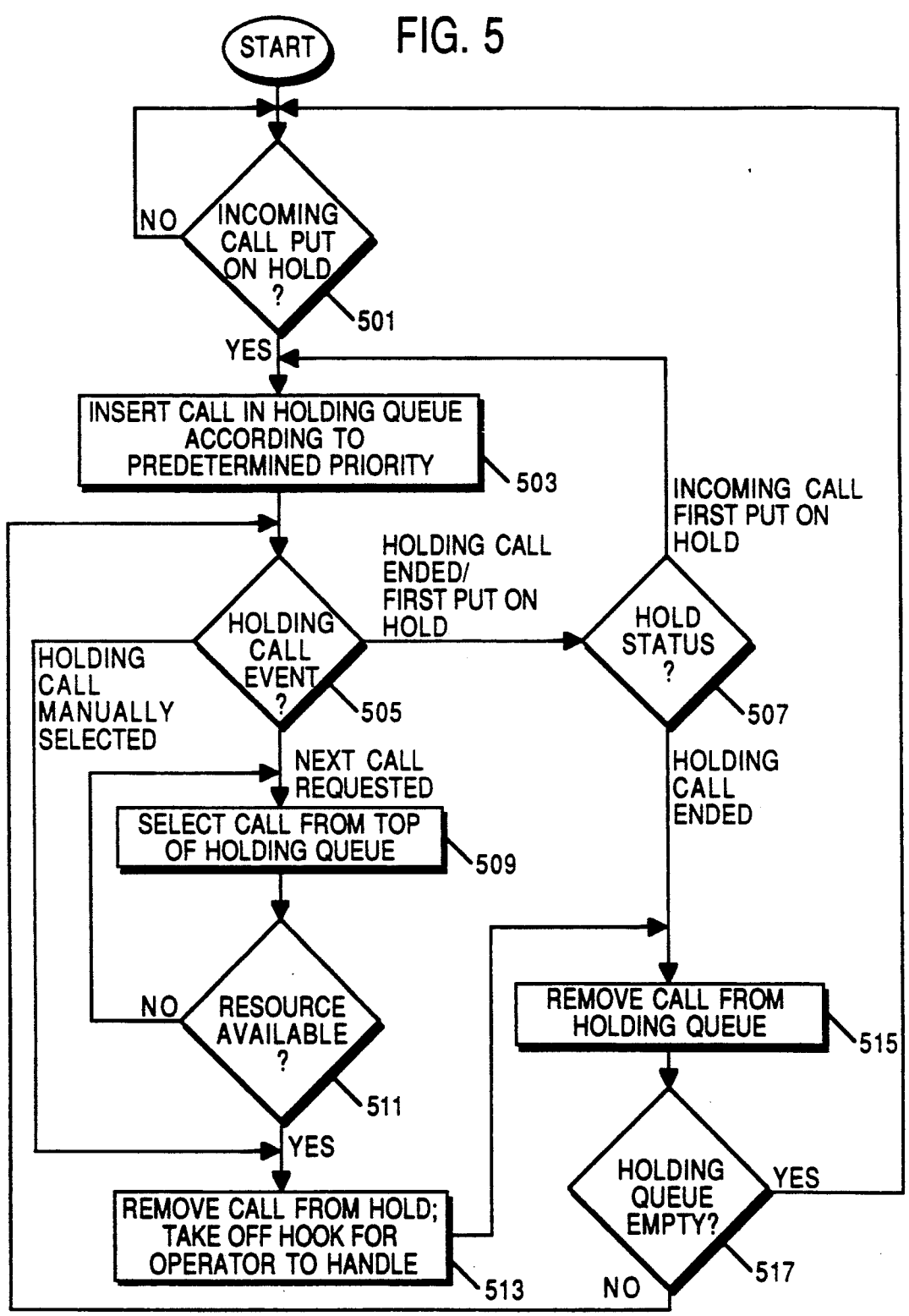
FIG. 5 is a flowchart showing selection of the next call to be removed from hold in accordance with the invention.

Selection of the next call to be removed from hold is shown in a flowchart in FIG. 5. If at step 501 a new incoming call is put on hold (one that is not yet in the holding queue 209), the call is inserted in the holding queue 209 according to a predetermined priority at step 503. This priority may be as simple as chronological order, where the first call on hold time-wise is placed at the top of the queue 209, and each subsequent call is placed below it as time progresses. A priority may be set up which distinguishes between emergency resources and non-emergency resources, and all emergency resources are placed at the top of the queue 209, in chronological order, and all non-emergency resources are placed below any emergency resources which may be in the queue 209. There are many other priorities, but no others will be detailed here for the sake of simplicity.

If the holding call event at step 505 is a next holding request, as accomplished by the operator pressing the next-holding button 305 on the console 300, the call at the top of the holding queue 209 is selected at step 509. If the resource for the selected call is available at step 511, the call is removed from hold and the resource is taken off hook for the operator to handle at step 513. At step 515, the selected call is removed from the holding queue 209. If the holding queue is empty, the process continues with step 501, otherwise the process continues with step 505. If the resource is not available at step 511, for example, another console may have acquired the resource before this console, another resource is sought by continuing with step 509. If the holding call event at step 505 is a call that is manually selected by the operator, the process continues with step 513. If the holding call event at step 505 is a holding call ended or first put on hold (hold status), the process continues with step 507. If at step 507 the hold status is an incoming call that is first put on hold, the process continues with step 503. If at step 507 the hold status is a holding call that has ended, for example due to the calling party terminating (hanging up) the call, the process continues with step 515.

Figure 6:
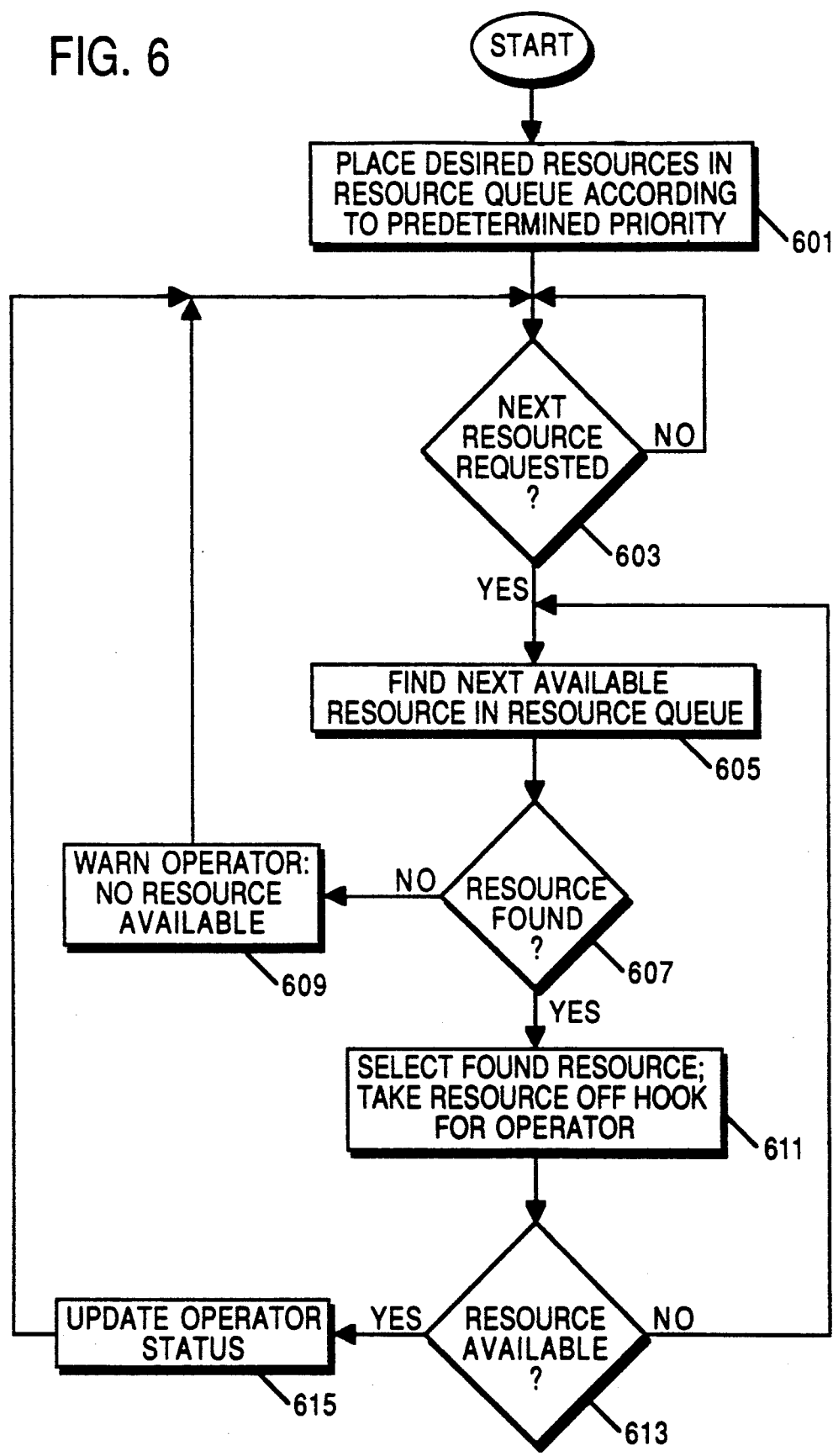
FIG. 6 is a flowchart showing selection of the next outgoing resource in accordance with the invention.

Selection of the next outgoing resource is shown in a flowchart in FIG. 6. The desired resources (as decided by the user) are placed in the resource queue 211 according to a predetermined priority at step 601. This priority may be as simple as physical order, where resources are sorted in the queue according to the location on the console 300. A priority may be set that distinguishes between emergency resources and non-emergency resources, where all emergency resources are placed at the bottom of the queue 211, and all non-emergency resources are placed above any emergency resources which may be in the queue 211. Listing all the resources in the resource queue 211 is not necessary, and is a function that can be used to prevent high-priority channels from being tied-up with outgoing calls. There are many other priorities, but no others will be detailed here for the sake of simplicity.

If the next resource is requested by the operator at step 603, as accomplished by the operator pressing the next-resource button 307 on the console 300, the next available resource in the resource queue 211 is attempted to be found at step 605. This is accomplished by checking each resource in priority order in the queue 211 to see if the resource is otherwise engaged (incoming call, on hold, and so forth). The first resource that is not in use is considered to be the next available resource, i.e. the found resource. If no resource is found at step 607, the operator is warned that no resource is available at step 609, and the process continues with step 603. If a resource is found at step 607, the found resource is selected and taken off hook for the operator at step 611, and the process continues with step 613. If at step 613 the selected resource is not available, for example, another console may have acquired the resource before this console, another resource is sought by continuing with step 605. If at step 613 the resource is available, the operator status is updated (see next paragraph for more on operator status) at step 615, and the process continues with step 603. Manual selection of a resource (i.e., pressing the off-hook button for a resource) by the operator operates as previously available, unaffected by the FIG. 6 process.

Operator status, which reflects the resource status, is the condition of the LEDs (not shown) designated for each button and for each resource on the console. For example, when a resource is incoming, the off-hook LED for the resource flashes. An idle resource has no LED flashing. A hold LED flashes for a call on hold. On the next-incoming-call button 303, an LED flashes when the incoming-call queue 207 contains at least one resource, is solid when a search is being made through the queue 207, and is off when the queue 207 is empty. On the next-holding button 305, an LED flashes when the holding queue 209 contains at least one resource, is solid when a search is being made through the queue 209, and is off when the queue 209 is empty. On the next-resource button 303, an LED is solid when a search is being made through the resource queue 211 and is off otherwise.

Figure 7:
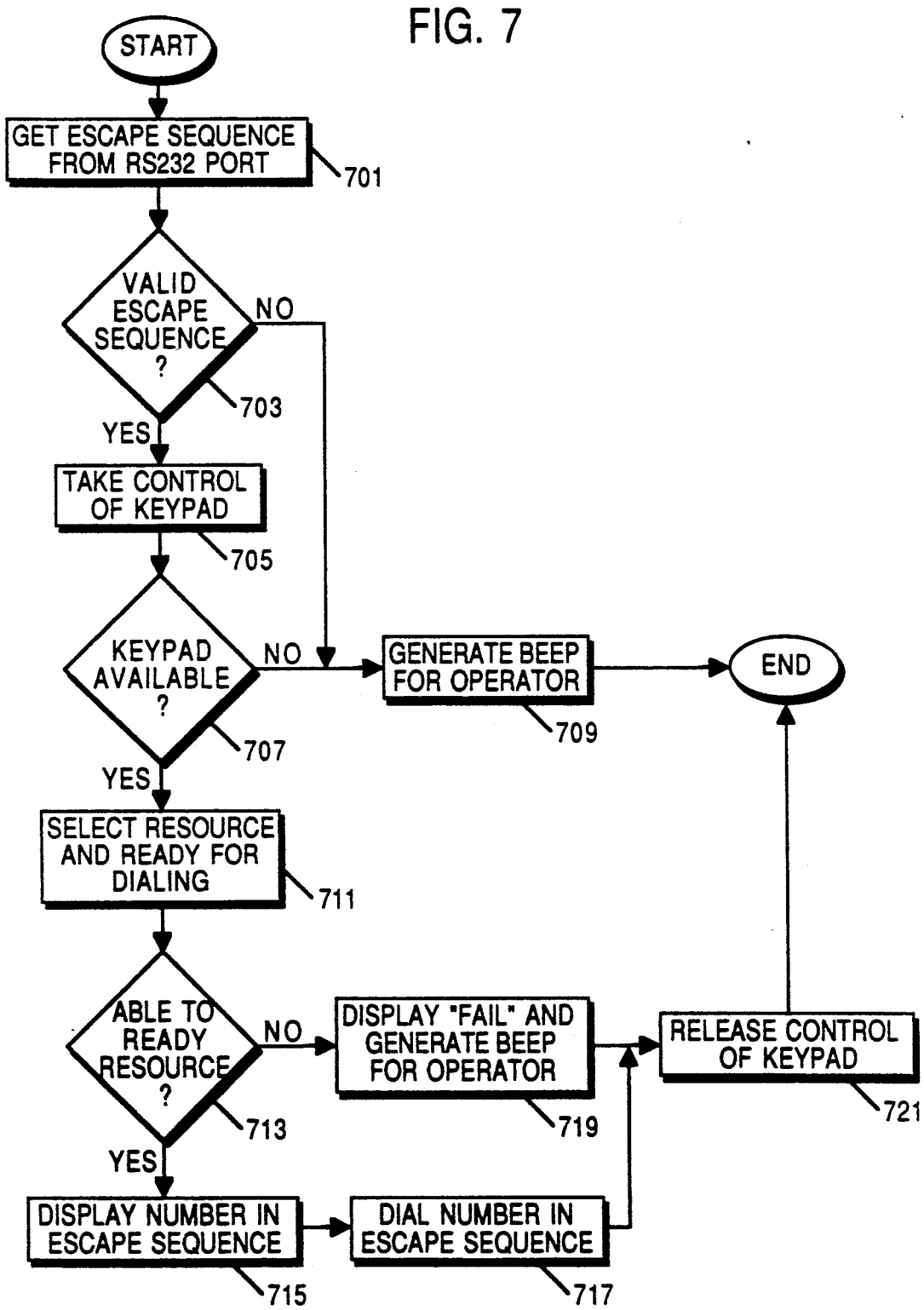
FIG. 7 is a flowchart showing automatic dialling of a phone number via computer in accordance with the invention.

Automatic dialling of a phone number via computer is shown in a flowchart in FIG. 7. An escape sequence is obtained from the RS232 port connected to the computer 121 at step 701. If this is a valid escape sequence, the process continues with step 705, otherwise the process continues with step 709. At step 705, the microprocessor 203 takes control of the keypad 313 to prevent the operator or other entity from erroneously entering keypad commands. If the keypad is not available at step 707, the process continues with step 709, when an audible beep is generated for the operator, and the process ends.

If the keypad is available at step 707, a resource is selected by simulating the next-resource button 307 and readied for dialing at step 711. If the resource was unable to be readied at step 713, a "FAIL" message is displayed, an audible beep is generated for the operator at step 719, and the process continues with step 721. If the resource was able to be readied at step 713, the telephone number in the escape sequence is displayed at step 715 and dialed at step 717. Keypad control is released at step 721, and the process ends.

The processes shown in the flowcharts in FIG. 4, FIG. 5, FIG. 6, and FIG. 7 are performed by the microprocessor 203 in FIG. 2.

The above method and apparatus provides an operator of a communication console with necessary resources to quickly and efficiently handle multiple incoming communication resources simultaneously. The highest priority incoming call, call on hold, or available resource is automatically provided to the operator at the touch of a single button. The operator is freed from having to search a large area for a specific resource, thus saving time that could very well be critical, especially in an emergency situation.

What is claimed is:

1. A communication console station comprising:
   means for linking a plurality of communication resources to the communication console station simultaneously;
   means for receiving a first incoming call on a first of said plurality of communication resources;
   means for receiving a second incoming call on a second of said plurality of communication resources while said first incoming call is received;
   means for placing in an incoming-call queue said first incoming call and said second incoming call according to a predetermined priority; and
   means, coupled to said means for placing, for automatically selecting an incoming call from said incoming-call queue when it is desired to answer an incoming call.

2. The communication console station of claim 1 further comprising means, coupled to said means for linking, for manually selecting any one of said received incoming calls when it is desired to answer an incoming call.

3. The communication console station of claim 1 wherein said means for selecting further comprises means for choosing an incoming call with the highest priority in said incoming-call queue.

4. A communication console station comprising:
   means for linking a plurality of communication resources to the communication console station simultaneously;
   means for receiving a first incoming call on a first of said plurality of communication resources and putting said first incoming call on hold;
   means for receiving a second incoming call on a second of said plurality of communication resources and putting said second incoming call on hold while said first incoming call is on hold;

means for inserting in a holding queue said first incoming call on hold and said second incoming call on hold according to a predetermined priority; and means, coupled to said means for inserting, for automatically selecting a incoming call on hold from said holding queue when it is desired to remove an incoming call from hold.

5. The communication console station of claim 4 further comprising means, coupled to said means for linking, for manually selecting any one of said incoming calls on hold when it is desired to remove an incoming call from hold.

6. The communication console station of claim 4 wherein said means for selecting further comprises means for choosing an incoming call on hold with the highest priority in said holding queue.

7. A communication console station comprising:

means for linking a plurality of communication resources to the communication console station simultaneously;

means for placing in a resource queue at least two of said plurality of communication resources according to a predetermined priority; and means, coupled to said means for placing, for automatically selecting for an outgoing call one of said at least two of said plurality of communication resources from said resource queue.

8. The communication console station of claim 7 further comprising means, coupled to said means for linking, for manually selecting for an outgoing call any communication resource of said plurality of communication resources.

9. The communication console station of claim 7 further comprising:

means, coupled to said means for linking, for connecting to a computer having at least one telephone number; and means, coupled to said means for connecting, for automatically dialing said at least one telephone number on said selected communication resource when said at least one telephone number is chosen on said computer.

10. The communication console station of claim 7 wherein said means for selecting further comprises means for choosing a resource with the highest priority in said resource queue.

11. A method of selecting a call in a communication console station comprising the steps of:

linking a plurality of communication resources to the communication console station simultaneously;

receiving a first incoming call on a first of said plurality of communication resources;

receiving a second incoming call on a second of said plurality of communication resources while said first incoming call is received;

placing in an incoming-call queue said first incoming call and said second incoming call according to a predetermined priority; and automatically selecting an incoming call from said incoming-call queue when it is desired to answer an incoming call.

12. The method of claim 11 further comprising the step of manually selecting any one of said received incoming calls when it is desired to answer an incoming call.

13. The method of claim 11 wherein said selecting step further comprises the step of choosing an incoming call with the highest priority in said incoming-call queue.

14. A method of selecting a call in a communication console station comprising the steps of:

linking a plurality of communication resources to the communication console station simultaneously;

receiving a first incoming call on a first of said plurality of communication resources and putting said first incoming call on hold;

receiving a second incoming call on a second of said plurality of communication resources and putting said second incoming call on hold while said first incoming call is on hold;

inserting in a holding queue said first incoming call on hold and said second incoming call on hold according to a predetermined priority; and automatically selecting a incoming call on hold from said holding queue when it is desired to remove an incoming call from hold.

15. The method of claim 14 further comprising the step of manually selecting any one of said incoming calls on hold when it is desired to remove an incoming call from hold.

16. The communication console station of claim 14 wherein said selecting step further comprises the step of choosing an incoming call on hold with the highest priority in said holding queue.

17. A method of selecting a communication resource in a communication console station comprising the steps of:

linking a plurality of communication resources to the communication console station simultaneously;

placing in a resource queue at least two of said plurality of communication resources according to a predetermined priority; and automatically selecting for an outgoing call one of said at least two of said plurality of communication resources from said resource queue.

18. The method of claim 17 further comprising the step of manually selecting for an outgoing call any communication resource of said plurality of communication resources.

19. The method of claim 17 further comprising the steps of:

connecting to a computer having at least one telephone number; and automatically dialing said at least one telephone number on said selected communication resource when said at least one telephone number is chosen on said computer.

20. The method of claim 17 wherein said selecting step further comprises the step of choosing a resource with the highest priority in said resource queue.

* * * * *